United States Patent [19]

Haytayan

[11] 4,128,110
[45] Dec. 5, 1978

[54] CONTROL VALVES

[75] Inventor: Harry M. Haytayan, Lincoln, Mass.

[73] Assignee: Pneutek, Inc., Billerica, Mass.

[21] Appl. No.: 754,424

[22] Filed: Dec. 27, 1976

[51] Int. Cl.$^2$ ............................................. F16K 11/04
[52] U.S. Cl. ............................. 137/454.2; 137/625.27; 251/361
[58] Field of Search ................. 137/625.27, 454.2; 251/361, 362, 363

[56] References Cited

U.S. PATENT DOCUMENTS

| 2,716,421 | 8/1955 | Bertrand | 251/362 X |
| 2,953,347 | 9/1960 | Phillips | 251/361 |
| 3,016,917 | 1/1962 | Hunt | 137/625.27 |
| 3,544,065 | 12/1970 | Mercier | 251/361 X |
| 3,675,896 | 7/1972 | Mercier | 251/361 X |

*Primary Examiner*—Alan Cohan
*Attorney, Agent, or Firm*—Schiller & Pandiscio

[57] ABSTRACT

A simple and rugged three-way valve is disclosed which may be used as a trigger-operated control valve for portable pneumatic tools. The valve utilizes a novel valve member slidably disposed in a valve chamber for reciprocal movement between two valve seats and is arranged so that it cannot obstruct a side port that is located between the valve seats.

1 Claim, 3 Drawing Figures

CONTROL VALVES

A. BACKGROUND OF THE INVENTION

1. Field of the Invention

This invention relates to valves in general and in particular to control valves for use with pneumatic devices.

2. Description of the Prior Art

Many pneumatic devices require control valves that are cheap, reliable and rugged. Heretofore it has been proposed to employ a three-way ball valve of the type comprising a valve body having two axially spaced ports, a valve seat associated with each of those ports, a third port located between the other two ports, a valve member in the form of a ball which is free to move between the two valve seats and an actuating pin for urging the ball against one of the two valve seats. Such a valve is disclosed in U.S. Pat. No. 3,927,459 as the trigger-operated control valve for a pneumatic impact tool used to drive nails. However, while such a ball valve has certain advantages, it also has liabilities. For example, it suffers from the limitation that its operation is not sufficiently precise; also that the ball member may occasionally tend to impede the full flow of fluid through the side port when it is disposed intermediate of its two valve seats.

Another problem with control valves of the type shown in U.S. Pat. No. 3,927,459 is the lack of reliability in the resilient seals which serve as the valve seats. There is a tendency for the seals, which typically are washers made of an elastomer such as neoprene, butyl rubber or silicone rubber, to delaminate from its mount, i.e. to separate from the surface of the valve to which it is attached. In control valves of the type shown in U.S. Pat. No. 3,927,459, the seals 94 and 96 which are engaged by the valve member in its upper and lower positions are usually attached to their mount by a cement and/or a friction fit. As a consequence of the cycling of air that occurs when the valve is operated, however, the high pressure air will tend to intrude under the seals wherever there is a gap or weakness in the bond between the seals and their supporting surfaces and thereby cause the seals to separate from their supporting surfaces or otherwise shorten their expected life. Another problem is achieving good sealing between the ball member and the valve seats under varying ambient conditions.

B. OBJECTS OF THE PRESENT INVENTION

Consequently, the primary object of this invention is to provide a control valve which retains substantially all of the advantages of control valves of the type shown in said U.S. Pat. No. 3,927,459 and at the same time solves many of the problems associated with that type of valve.

A more specific object is to provide a control valve which is equipped with new and improved seals that will not separate from their supporting surfaces and which comprises a valve member that is shaped to provide excellent seating, is self-guiding and will not bind in its chamber, cannot obstruct the side port of the valve, and has a short operating stroke and assures full fluid flow and quick response.

C. SUMMARY OF THE INVENTION

These and other objects which are hereinafter described or rendered obvious are achieved by providing a valve which comprises one resilient valve seal which is uniquely fitted to the reciprocal valve member. The valve may have another resilient valve seal which serves as a valve seat and is secured in place by clamping it between the valve body and the tool or other device to which the valve is attached. The preferred embodiment of the invention is a control valve comprising a valve body with at least three ports, a slide valve assembly comprising a valve member with opposed seating surfaces, and first and second valve seats disposed so that (1) a first port is blocked off when one valve seat is engaged by one of the seating surfaces of the valve member, (2) a second port is blocked off when the other valve seat is engaged by the other seating surface of the valve member, and (3) the valve member passes by the third port as it moves from one seat to the other. The valve member is shaped and sized so as to minimize interference with flow through the third port and also to make a close sliding fit with the surrounding portion of the valve body.

D. BRIEF DESCRIPTION OF THE DRAWINGS

Further objects, the nature and many of the advantages of the present invention will be more fully described or rendered obvious in the course of the following detailed description, which is to be considered together with the accompanying drawings wherein like numbers refer to like parts and further wherein.

E. DETAILED DESCRIPTION OF THE INVENTION

Figure 1:
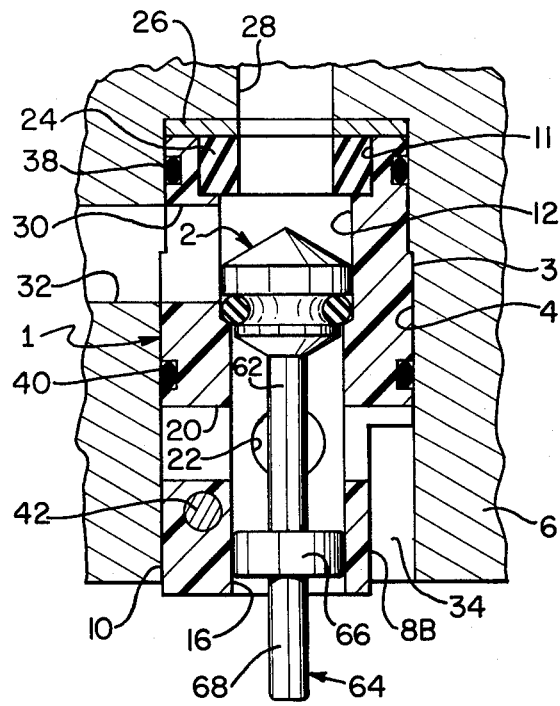
FIG. 1 shows a side view in partial longitudinal section of the preferred embodiment of the present invention.
Figure 2:
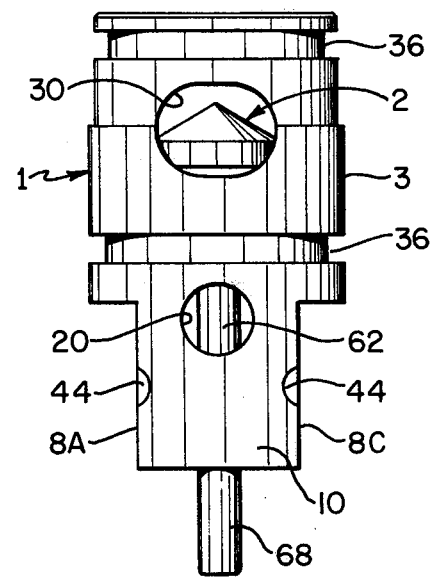
FIG. 2 shows a side view in elevation of the same valve rotated 90° from FIG. 1.

Referring first to FIGS. 1 and 2, it may be seen that the illustrated valve comprises a hollow valve casing 1 in which is slidably disposed a valve member 2, hereinafter described in detail. Casing 1 has a cylindrical outer surface 3 so that the valve may be inserted into a round bore 4 formed in a part of the wall 6 of the housing of a tool or other device with which the valve is to be used, e.g. a tool as shown in U.S. Pat. Nos. 3,927,459 or 3,711,008. The bottom portion of cylindrical outer surface 3 is cut away in such a manner that it forms four discrete sides, three of the sides being identical flat surfaces 8A, 8B and 8C adjoining one another at right angles, and the fourth side 10 being a 90° arc of the cylindrical outer surface 3 of valve casing 1.

Figure 3:
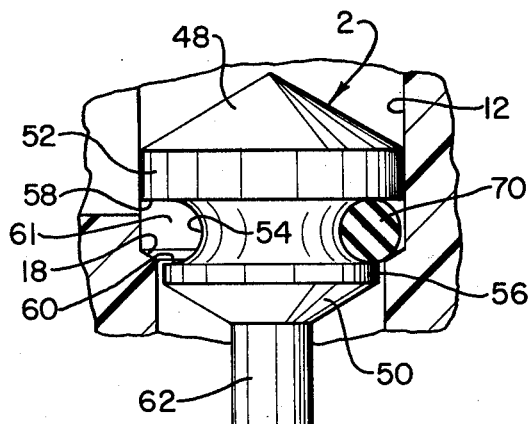
FIG. 3 shows a side view in partial longitudinal section of a preferred embodiment of the valve head.

A circular bore 11 extends axially downward from the top of valve casing 1, meeting a coaxial circular bore 12 of smaller diameter. Hence at the inner end of bore 11 the valve casing has an annular shoulder 14. A circular bore 16 rises coaxially from the bottom of valve casing 1 so as to join circular bore 12. Bore 16 has a smaller diameter than circular bore 12, thus forming an annular shoulder 18 at the lower end of bore 12. Shoulder 18 serves as a valve seat for valve member 2 when the latter is in its "down" position. Shoulder 18 may be flat, ie., extend radially of the axis of bore 12, but preferably it is tapered as shown in FIG. 3.

A circular bore 20 extends diametrically of valve casing 1 and completely penetrates the casing so as to be open on both ends. It runs from surface 10 to surfaces 3 and 8B, striking the latter perpendicularly. Another circular bore 22 lies on the same plane as bore 20 and intersects it perpendicularly, completely penetrating valve casing 1 so as to be open on both ends. Circular bores 16, 20 and 22 all intersect one another at right angles.

Set into circular bore 11 is a resilient ring 24 which serves as a valve seat for the valve member 2 when the latter is in its "up" position. Ring 24 is sized so that in its asformed or pre-installation state its axial dimension is slightly greater than the length of bore 11. It rests upon and overlaps annular shoulder 14 as shown. Ring 24 is preferably, though not necessarily, made of an elastomer having a hardness of 60-70 durometer on the A scale. When mounted in bore 11, ring 24 makes a close fit with valve casing 1.

Disposed between the upper end of valve casing 1 and the tool housing wall 6 is a circular metal washer 26. Washer 26 has an outside diameter which is larger than the diameter of bore 11 and is equal to or smaller than the outside diameter of valve casing 2. The inner diameter of washer 26 is preferably identical in size to the inner diameter of ring 24, though it may be larger or smaller. Washer 26 serves to compress ring 24 and hold it tight against annular surface 14. A circular passageway or port 28, having a diameter preferably identical in size to the inner diameter of washer 26, is provided in housing wall 6 in alignment with the passageway defined by the inner surface of ring 24. In the typical installation of the valve, port 28 serves as an inlet for conducting high pressure air from the tool into the interior of the valve. In this manner port 28, washer 26 and ring 24 form an isodiametric passageway leading from a high pressure air chamber (at the other end of port 28) into circular bore 12.

Further down valve casing 1 is a side port 30 which extends radially from bore 12 to a port 32 in housing wall 6. In the installation, port 32 leads to a pressure-operated mechanism (not shown) which, for example, might be a poppet valve as described in U.S. Pat. No. 3,711,008. Near the bottom of casing 1 is an air vent passageway 34 which serves to connect to the atmosphere the side openings formed in the valve body by bores 20 and 22. Passageway 34 is formed by the gaps between the three side surfaces 8A, 8B and 8C of casing 1 and housing wall 6.

Valve casing 1 has two axially spaced peripheral grooves 36 to accommodate resilient O-rings 38 and 40 which serve to prevent the pressurized operating fluid, such as air, from leaking out between casing 1 and the surrounding tool housing wall 6. Valve casing 1 is secured in place by a variety of convenient means, e.g. by a locking pin 42 which extends through a transverse lock bore 44 in casing 1 and has one or both of its ends received in holes in housing wall 6, so that washer 26 is caused to clamp ring 24 tightly against shoulder 14.

The valve member 2 is disposed in circular bore 12, as shown in FIGS. 1 and 3. This member has an upper conical surface 48 and a lower frusto-conical surface 50. Located between surfaces 48 and 50 are a first cylindrical surface 52, a second smaller diameter cylindrical surface 56, a first annular surface 58, a second annular surface 60, and a concave surface 54 which coacts with surfaces 58 and 60 to form a peripheral groove 61 with a concave base. Rim-like surface 52 intersects the base of the conical surface 48 and while rim 52 may be rounded or sharply angular or even be a knife edge (as viewed in cross-section), it is preferred that it be a cylindrical surface as shown. Rim 52 intersects annular surface 58 which leads to the concave surface 54 which in turn leads to annular surface 60. The latter intersects rim-like surface 56 which joins the lower frusto-conical surface 50. Surfaces 48, 50, 52, 54 and 56 are all coaxial, with rim 52 having a greater diameter than rim 56 and rim 56 having a lesser diameter than bore 16. Furthermore, note that valve member 2 is sized so as to form a sliding fit in circular bore 12. Typically, the diameter of rim 52 is between about 0.001 to about 0.005 inch less than the diameter of the surrounding inner surface of the valve casing. This not only provides a good sliding fit but also assures that the valve member will not jam in the casing and little or no air can leak between rim 52 and the surrounding wall which defines circular bore 12.

Attached to frusto-conical surface 50 is a stem 62, which is in turn attached to a valve rod assembly 64. This assembly comprises a piston 66, which is sized so as to make a close sliding fit in circular bore 16, and a rod 68 leading out of circular bore 16. Preferably the diameter of piston 66 is less than the diameter of the inner surface of the valve casing by between about 0.001 and about 0.005 inch, while rim 56 has a diameter which is about .010 inch less than the diameter of bore 16. Piston 66 serves primarily to keep valve rod assembly 64 and valve member 2 aligned within the axis of circular bores 16 and 12 respectively. In turn, rim 52 coacts with the surrounding casing surface to guide the valve member and thus help keep the valve rod assembly aligned in bore 16. This assures that rim 56 will not hang up on shoulder 18 when the valve member is moved down to the position shown in FIG. 1. Preferably, but not necessarily, valve member 2, stem 62 and valve rod assembly 64 are made as an integral unit from one piece of metal.

Mounted in the groove 61 is an O-ring 70. It is made of a resilient, tear-resistant material. When properly positioned in groove 61, O-ring 70 has an outer diameter which is slightly smaller than the diameter of rim 52 so as not to interfere with movement of valve member 2 in the casing, and also larger than the diameter of rim 56 so as to protrude from groove 61. This feature allows O-ring 70 to engage shoulder 18 and thus act as a resilient seal for the valve member when the latter is in its "down" position, as described in greater detail below. O-ring 70 is made of a suitable resilient material, preferably an elastomer such as a natural or synthetic rubber.

The O-ring 70 is formed with an internal diameter that is slightly smaller than the corresponding diameter of concave surface 54 so that ring 70 is stretched when it is seated in groove 61; the resulting contracting tension causes the O-ring to grip and secure itself to the valve head member.

Now as a person skilled in the art will readily understand, if a stream of pressurized fluid is introduced into the valve via port 28, valve member 2 will be driven away from port 28 and forced into seating engagement with shoulder 18. While pressed against shoulder 18 in this "down" position, the resilient O-ring 70 will act as a seal to effectively prevent pressurized fluid from escaping past annular shoulder 18 to the outside atmosphere via bores 20 and 22 and air vent passageway 34. Instead, all of the pressurized fluid will be directed out of opening 30, through port 32 and on to the pressure-operated mechanism.

If, however, valve assembly 64 is directed upwards, e.g. by means of a trigger member as shown in U.S. Pat. No. 3,927,456, valve member 2 will move off the valve seat formed by annular shoulder 18 and thereby allow pressurized fluid at port 32 to escape to the outside atmosphere via circular bores 20 and 22 and air vent passageway 34. So long as valve member 2 is not seated tightly against annular shoulder 18, any high-pressure fluid entering the valve via port 28 will be leaked to the outside atmosphere. Should valve member 2 be moved far enough upwards so that conical surface 48 firmly seats on resilient ring 24, i.e. into the "up" position, an effective seal will be made against any fluid entering the valve via 28.

As is believed obvious, the stroke through which valve member 2 is required to be moved is relatively short and can be accomplished very quickly. In this connection it should be noted that preferably shoulder 18 is located so that the valve member needs to be raised a relatively short but definite and unvarying distance before the widest portion of O-ring 70 clears the lower side of opening 30 and thereby allows air to flow at a substantial rate from port 32 to vent passageway 34. Furthermore the distance between the upper edge of rim 52 and the level of the widest portion of O-ring 70 is substantially less than the diameter of valve opening 30. Hence in any of its possible positions between shoulder 18 and valve seat 24, valve member 2 cannot fully obstruct opening 30 and air can flow between ports 28 and 32 or between port 32 and vent passageway 34 so long as the valve member is disengaged from valve seat 24 in the first case and shoulder 18 in the second case.

F. MODIFICATIONS OF THE ILLUSTRATED EMBODIMENTS

It should be noted that the embodiments illustrated and described herein are intended solely for the sake of example and clarity and are to be in no way construed as limiting the scope of the present invention, since various alterations may be carried out on the illustrated embodiments without departing from the essential features of this invention.

Thus, for example, one possible modification is to alter the external geometry of valve casing 2 to something other than essentially round, e.g. square or triangular. Furthermore, the leading tip of surface 48 may be rounded off. Also, although the valve casing 3 is preferably made of a plastic material, it may be made of another suitable material, e.g. anodized aluminum.

These and other changes of their kind are foreseen as readily obvious to one skilled in the art.

G. ADVANTAGES OF THE PRESENT INVENTION

There are numerous advantages to using valves made in accordance with this invention. First, the new valve head provides better seating characteristics than the ball member shown in U.S. Pat. No. 3,927,459. Second, the valve head design helps assure that full flow of fluid can occur through the side port when the valve head is disposed intermediate of its two seats. And third, the valve member seals utilized in the present design are more resistant to separation or delamination than seals used in valves already referred to. By fitting O-ring 70 onto the valve member, a superior attachment is formed between the O-ring and valve member which is sufficiently secure to effectively prevent delamination of the O-ring 70. Similarly the ring 24, while not adhesively bonded to valve casing 2, is nevertheless tightly secured by virtue of the fact that it is captivated between shoulder 14 and washer 26, with the latter itself being captivated between the upper end surface of valve casing 1 and the adjacent annular surface formed by tool housing 6. By making the ring 24 slightly longer than the axial length of bore 11, the ring is compressed axially between metal washer 26 and annular shoulder 14 when the valve casing is captivated in the bore 4 formed in the tool housing 6. This compression of ring 24 assures intimate contact between its outer and bottom surfaces and the adjacent surfaces defining bore 11 and shoulder 14. As a consequence, ring 24 cannot be dislodged and thereby impede operation of the valve.

What is claimed is:

1. In combination with a tool having a port with a shoulder in said port, a control valve comprising a hollow valve casing disposed in said port, said casing having (1) a bore for accommodating a slide valve unit with said bore having an enlarged section defining a valve chamber, (2) first, second and third openings for conducting flow of fluid into and out of said casing via said valve chamber, and (3) first and second axially aligned valve seats at opposite ends of said valve chamber, said first opening being at one end of said bore and said second and third openings intersecting said bore, said second valve seat having a sloping surface, said first valve seat being comprised of a resilient cylindrical ring located in a counterbore of said bore at said first opening and said second valve seat being located between said second and third openings, said cylindrical ring being captivated between (1) a first annular shoulder which is formed along the bore and engages one side of said ring and (2) a flat metal washer which engages a second opposite side of said ring and is captivated between an end surface of said valve casing and the shoulder in said port; and a slide valve unit having a valve stem slidably disposed within said bore and a valve head attached to the inner end of said stem and movable by said stem into engagement alternatively with said first and second valve seats, said valve head being sized so that (1) it makes a close sliding fit at its periphery with a surrounding portion of said valve casing, (2) fluid pressure applied via said port and said first opening will force said valve head way from said first valve seat toward said second valve seat, (3) when it is engaged with either said first or second valve seat it will block flow of fluid through said first or second opening respectively, and (4) at all positions along its path of travel between the two valve seats it is incapable of blocking flow of fluid into or out of said valve casing via said third opening, and said valve head comprising a peripheral groove and a seal in the form of a resilient O-ring disposed within said groove for sealingly engaging said second valve seat when said valve head is forced toward said second valve seat.

* * * * *